United States Patent [19]

Brewer et al.

[11] 4,431,219

[45] Feb. 14, 1984

[54] REPLACEABLE TUBULAR CONNECTOR

[75] Inventors: Jimmy D. Brewer, Houma; Albert W. Gunther, Jr., New Orleans; Albert W. Gunther, Sr., Gretna, all of La.

[73] Assignee: Pressure Associated Tool Company, Inc., Houma, La.

[21] Appl. No.: 357,332

[22] Filed: Mar. 11, 1982

[51] Int. Cl.³ .................... F16L 25/00; F16L 19/00
[52] U.S. Cl. ................................... 285/333; 285/334; 285/355; 285/369
[58] Field of Search ............... 285/333, 334, 355, 390, 285/369

[56] References Cited

U.S. PATENT DOCUMENTS

| | | | |
|---|---|---|---|
| 1,562,372 | 11/1925 | Sheldon | 285/333 X |
| 2,021,184 | 11/1935 | Hill | 285/333 |
| 2,117,357 | 5/1938 | Peterson | 285/333 X |
| 2,671,949 | 3/1954 | Welton | 285/334 X |
| 3,126,214 | 3/1964 | Wong et al. | 285/333 X |
| 3,336,054 | 8/1967 | Blount et al. | 285/333 X |
| 3,658,368 | 4/1972 | Hokanson | 285/333 |
| 3,667,784 | 6/1972 | Hokanson et al. | 285/334 X |

Primary Examiner—Richard J. Scanlan, Jr.
Attorney, Agent, or Firm—Pravel, Gambrell, Hewitt, Kirk & Kimball

[57] ABSTRACT

A replaceable tubular threaded connector for interconnecting two tubular sections having an elongate tubular body formed having an axial inner bore therethrough, the tubular body having an upper threaded end and a lower threaded end, wherein the tubular body is adapted to be threadedly mounted between adjacent tubular sections.

1 Claim, 4 Drawing Figures

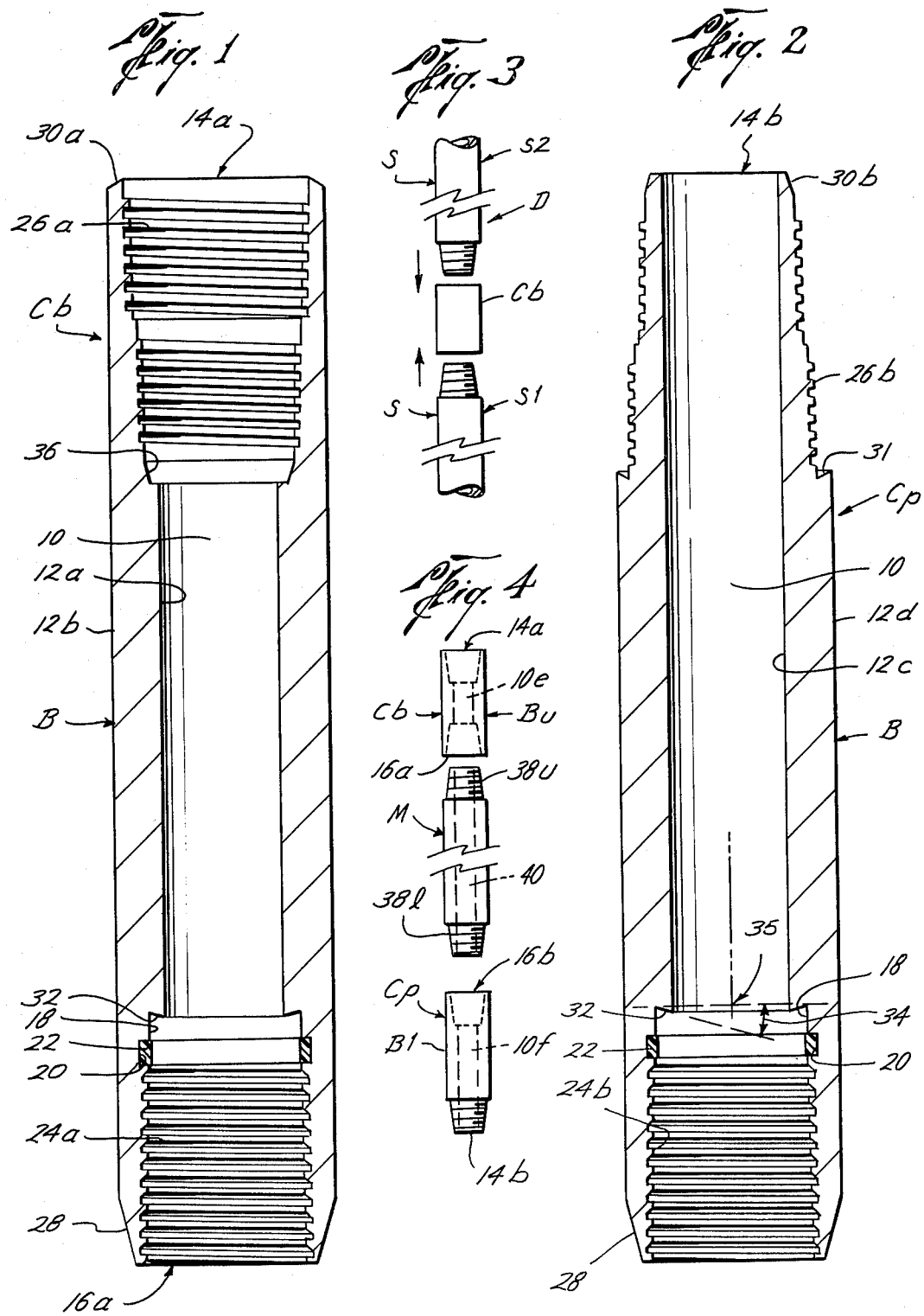

REPLACEABLE TUBULAR CONNECTOR

FIELD OF THE INVENTION

The present invention relates generally to tubular sections for earth drilling apparatus and more particularly to replaceable tubular threaded connectors for interconnecting tubular sections.

DESCRIPTION OF THE PRIOR ART

In earth drilling operations a drill string is constructed from a plurality of threadedly interconnected tubular sections or pipes. The tubular sections generally are shuttled to and from a storage location to a vertical position on the drilling rig for connection to the drill string to perform various earth drilling operations. Often the threaded connections of the tubular section are exposed and susceptible to frequent damage. When the threaded connections of such a tubular section are damaged, it is necessary to recut the threads of the damaged tubular section. This recutting requires long periods of time, during which the expensive pipe sections cannot be used. Moreover, the successive recutting of new threads can weaken the newly recut threads or make the drill pipe markedly shorter.

SUMMARY OF THE INVENTION

The present invention relates to a new and improved replaceable tubular threaded connector having an elongate tubular body formed with an inner bore therethrough for the passage of a fluid. The tubular body is adapted for threaded connection in the drill string at its upper and lower ends, with the bore of the tubular body in communication with the bore of the drill string.

BRIEF DESCRIPTION OF THE DRAWINGS

FIG. 1 is a longitudinal, elevational cross-sectional view of the tubular body of the present invention having two threaded box connections;

FIG. 2 is a longitudinal, elevational cross-sectional view of the tubular body of the present invention having a threaded pin connection and a threaded box connection;

FIG. 3 is a longitudinal, elevational view of the connector of the present invention as mounted between adjoining tubular sections of a drill string; and, FIG. 4 is a longitudinal, elevational view of a singular tubular section or drill string having connectors of the present invention mounted at each end thereof.

BEST MODE FOR CARRYING OUT THE INVENTION

Referring now to FIGS. 1 and 2, replaceable tubular threaded connectors of the present invention are designated generally Cp and Cb and are particularly adapted for threadedly interconnecting two adjacent tubular sections S (FIG. 3) of a drill string D for protecting exposed threaded connections at the upper and lower ends of the tubular sections S. Typically, a drill string D may include a plurality of tubular sections S for performing the wide variety of operations typically encountered in well operations including drilling, workover and the like.

Each of the replaceable tubular threaded connections Cp, Cb of the present invention includes an elongate tubular body B formed having an axial inner bore 10 therethrough. The tubular body B of the threaded connectors Cb, Cp has upper or first threaded ends 14a, 14b and lower or second threaded ends 16a, 16b, respectively. The tubular body B is adapted to be threadedly mounted between adjacent tubular sections S of the drill string D (FIG. 3). The length of the tubular body B is preferably substantially less than the length of the tubular sections S of the drill string D.

The replaceable tubular box threaded connector Cb of FIG. 1 is formed having a threaded box connection at the first or upper end 14a and a threaded box connection at the second or lower end 16a of the tubular body B. The upper and lower threaded box ends 14a, 16a are formed having threads 16a, 24a, respectively, with the interior of the tubular body B. The threaded box connections are particularly adapted to receive compatibly formed pin or male threaded ends of a tubular section or pipe S of the drill string D.

Referring to FIG. 2, the replaceable tubular pin threaded connector Cp is formed having a threaded pin connection at the first or upper end 14b and a threaded box connection at the second or lower end 16b. The tubular pin threaded connector Cp of FIG. 2 receives the compatibly formed male or pin end of a tubular section or pipe S at the box connection formed in the second or lower end 16b as described above.

The threaded pin connection forming the first or upper end 14b (FIG. 2) has exterior threads 26b on the exterior of tubular body B. The threaded pin connection at the first end 14b is adapted to threadedly interconnect with a compatibly formed threaded box end, such as the first end 14a of tubular threaded pin connector Cp of FIG. 1 or a tubular section S having the desired box connection formed at one end thereof.

Referring particularly now to FIG. 1, the tubular body B of the threaded connector Cb, includes an inner annular surface 12a and an outer annular surface 12b. The inner annular surface 12a defines an axial bore 10 for the passage of a fluid therethrough. The second or lower end 16a is formed with a box connection having threads 24a cut into the interior of tubular body B. Adjacent to the threads 24a, an annular surface 18 is formed having a diameter greater than the diameter of axial bore 10 and is formed parallel thereto. An annular detent 20 is formed in the annular surface 18 and mounts a deformable seal ring 22 for sealing against fluid leakage between the threadedly interconnected tubular section S and the threaded box connection of the replaceable tubular threaded connector Cp or Cb, as discussed below.

A conical lip 32 is formed with the annular surface 18 at an acute angle 34 (FIG. 2) that inclines toward the lower or second threaded end 16a (or lower end 16b of FIG. 2). The conical lip 32 extends radially inwardly and upwardly from the axial inner bore 10 to the annular surface 18. The acute angle 34 is greater than 0° and preferably is between substantially 2° and substantially 10° from a plane 35 perpendicular to the inner bore 10.

It is preferred that the tubular section or pipe S that is threadedly interconnected with the lower box connection 16a or 16b of tubular connector Cp or Cb be formed having a pin threaded end having a surface compatible with lip 32 to engage lip 32 when tubular section S is threadedly interconnected with the box connection of tubular body B. Lip 32 and the compatible surface on the male, pin end of the tubular section S form an improved seal against the extrusion of the deformable seal 22 into the inner bore 10 and to insure against fluid migration therebetween.

The first or upper end 14a of the tubular body B of FIG. 1 has a threaded box connection showing specialty cut threads 26a. The specialty cut threads 26a can be of the type generally known as Hydril threads for improved joining and make-up between sections of pipe. Other types of specialty cut threads 26a may be used.

An upper tapered surface 30a and a lower tapered surface 28 are formed with the outer surface 12b of tubular body B of the tubular connector Cb. The upper and lower tapered surfaces 30a, 28 provide for ease in positioning the tubular body B into alignment with the drill string D.

Referring now to the replaceable tubular pin connector Cp of FIG. 2, the tubular body B has an inner annular surface 12c and an outer surface 12d, with the inner annular surface 12c defining the axial inner bore 10. The tubular body B has a threaded box connection with threads 24b formed with the second or lower end 16b, generally as described hereinabove with reference to the lower threaded box connection 16a of FIG. 1.

At the upper end 14b of tubular body B of the tubular pin connector Cp of FIG. 2, threads 26b in the outer surface 12d of tubular body B form a pin or male threaded connection 14b. FIG. 2 illustrates specialty cut threads 26b, such as Hydril type threads. Other types of specialty cut threads may be utilized. The tapered surface 30b with the first or upper end 14b promotes orientation of the threaded tubular pin connection Cp when the first or upper end 14b is threadedly engaged in a compatibly formed box connection, such as the box connection formed with first or upper end 14a of FIG. 1. Tapered surface 30b with the upper end 14b is adapted to engage a compatible tapered surface, such as a tapered surface 36 formed adjacent to threads 26a as shown in FIG. 1. Lip 31 (FIG. 2) is formed adjacent threads 26b and engages a compatible tapered surface, such as the upper annular tapered surface 30a in FIG. 1, when the pin connection of FIG. 2 is threaded into a suitable box connection (as shown in FIG. 1).

In the use or operation of the replaceable tubular threaded connector Cp or Cb, a first tubular section S1 (FIG. 3) is threadedly interconnected into the desired end of the replaceable tubular threaded connector Cp or Cb. Following proper engagement between tubular section S1 and the selected connector Cp or Cb, a second tubular section S2 having a threaded end compatible with the remaining, exposed threaded end of the selected threaded connector Cp or Cb is threadedly interconnected forming the drill string D.

With the present invention, when the replaceable tubular threaded connectors Cp or Cb are interconnected with the tubular sections S prior to being made into the drill string D, the threaded ends of the tubular section S are protected from significant damage. Should the exposed threaded end of the replaceable tubular threaded connector Cp or Cb of the present invention be damaged, only the connector itself need be replaced. This results in considerable cost savings by minimizing the time lost typically encountered when the threaded ends of the tubular sections S must be recut due to damage.

Another embodiment of the present invention uses the replaceable tubular threaded connectors Cp and Cb described above to form a tubular section S. A tubular section S having replaceable tubular threaded connections Cp and Cb is particularly adapted for threaded interconnection in a drill string D. An elongate tubular member M is formed having an axial inner bore 40 therethrough (FIG. 4). The tubular member M has an upper threaded end 38u and a lower threaded end 38l. Upper and lower elongate tubular bodies Bu and Bl, respectively, are formed having an axial inner bores 10e, 10f, respectively therethrough.

Preferably, upper body Bu is a replaceable tubular box connector Cb of the type of FIG. 1, and the lower body Bl is a replaceable tubular pin connector Cp of the type of FIG. 2. The upper tubular body Bu has a first or upper threaded end 14a and a second or lower threaded end 16a. The lower tubular body Bl has a first or upper threaded end 16b and a lower or second threaded end 14b. The lower threaded end 16a of the upper tubular body Bu is adapted to be threadedly received with the upper threaded end 38u of the tubular member M. The upper threaded end 16b of the lower tubular body Bl is adapted to be threadedly mounted with the lower threaded end 38l of the tubular member M.

Preferably the tubular member M with upper and lower tubular bodies Bu and Bl form a length of pipe similar to the length that is conventionally used in a drill string D. The upper threaded end 38u and lower threaded end 38l are conventionally threaded. Both ends of tubular member M are formed at an angle compatible with conical lip 32 of FIGS. 1 and 2 to seal against the extrusion of deformable seal 22.

In operation of the tubular section S having replaceable tubular threaded connections Cb, Cp, the pin connection 14b interconnects with the compatible threaded box connection 14a of the adjacent tubular section S forming a drill string D. To disconnect the tubular sections S from the drill string, the operation is reversed.

With use of the present invention, when the threads of the tubular section S having replaceable tubular threaded connectors Cp and Cu are damaged, the short threaded tubular connectors Cp, Cb need only be removed and replaced with another similar connector, thereby protecting the threaded connections on the more expensive, significantly longer pipe member. Further, the pipe sections S are no longer reduced in length when a threaded connection is damaged. The time that such a pipe section is non-operational is greatly reduced to the time required for replacing the threaded tubular connector Cp, Cb, rather than the time required to recut threads.

The foregoing disclosure and description of the invention are illustrative and explanatory thereof, and various changes in the size, shape and materials, as well as in the details of the illustrated construction may be made without departing from the spirit of the invention.

We claim:

1. A replaceable tubular threaded connector particularly adapted for threadedly interconnecting two tubular sections of a drill string, the tubular sections being of constant outside diameter and each having an axial bore of constant diameter throughout its unthreaded length, the replaceable threaded connector for protecting exposed threaded connections of the tubular sections, comprising:

an elongate tubular body formed having throughout its substantial length an outer diameter equivalent to the outer diameter of the drill string tubular sections and an axial inner bore equivalent to the inner bore of the drill string;

said tubular body having an upper threaded connection and a lower threaded box connection;

said tubular body adapted to be threadably mounted between adjacent tubular sections and aligned with an axial bore of the tubular sections;

said tubular body having a length substantially less than the length of the tubular section in the drill string; and including:

an annular surface formed between said lower threaded box connection and said axial inner bore;

an annular detent formed in said annular surface;

a deformable seal ring mounted within said annular detent for sealing fluid passage between the tubular section and lower threaded box connection of said elongated tubular body; and, a conical lip formed with said annular surface at an acute angle between substantially 2° and substantially 10° from a plane perpendicular to said axial inner bore, said conical lip extending radially outwardly and upwardly from said axial inner bore to said annular surface.

* * * * *